United States Patent [19]

Buisson et al.

[11] Patent Number: 4,949,269
[45] Date of Patent: Aug. 14, 1990

[54] PROCESS AND SYSTEM FOR DETERMINING THE LONGITUDINAL POSITION OF THE CENTER OF GRAVITY OF AN AIRCRAFT PROVIDED WITH AN ADJUSTABLE HORIZONTAL STABILIZER

[75] Inventors: Dominique Buisson, Villemur; Joseph Irvoas, Cugnaux, both of France

[73] Assignee: Societe Nationale Industrielle et Aerospatiale, Paris, France

[21] Appl. No.: 251,709
[22] PCT Filed: Jan. 4, 1988
[86] PCT No.: PCT/FR88/00003
§ 371 Date: Aug. 12, 1988
§ 102(e) Date: Aug. 12, 1988
[87] PCT Pub. No.: WO88/05163
PCT Pub. Date: Jul. 14, 1988

[30] Foreign Application Priority Data

Jan. 8, 1987 [FR] France ............... 87 00117

[51] Int. Cl.[5] ........................... G01M 1/12
[52] U.S. Cl. ....................... 364/463; 73/65
[58] Field of Search ........... 364/463, 428; 73/65, 73/178 T; 235/61 T; 340/959

[56] References Cited

U.S. PATENT DOCUMENTS 3,584,503  6/1971  Senour ................... 73/65
3,701,279 10/1972 Harris et al. ............ 73/65
4,110,605  8/1978  Miller .................. 364/463
4,545,019 10/1985 Glover ................... 73/65
4,622,639 11/1986 Adelson et al. ......... 364/463
4,639,872  1/1987  McHale et al. ......... 364/463

FOREIGN PATENT DOCUMENTS 2381998 9/1978 France.

*Primary Examiner*—Gary Chin
*Attorney, Agent, or Firm*—Fisher, Christen & Sabol

[57] ABSTRACT

Method and system for determining the longitudinal position of the gravity center of an aircraft having an adjustable stabilizer. At a flight point for which the aircraft is in equilibrium with its elevator in aerodynamic prolongation of the adjustable stabilizer, the gravity center position is calculated from the position ($X_F$) of the focus (F) of the aircraft (1), the measurement of the deflection (iH) of the adjustable stabilizer, a first function K(M, N1) of the engine speed (N1) of the engines of the aircraft and the Mach number (M). The first function is representative of the deflection value (iHRef) of the adjustable stabilizer. In the case where the gravity center would be at the focus (F) of the aircraft, a second function H(Cz, M) of the lift coefficient (Cz) of the aircraft and of the Mach number (M) is used. The second function is representative of the stabilizer deflection variation for a variation of 1 percent of the gravity center position.

13 Claims, 4 Drawing Sheets

PROCESS AND SYSTEM FOR DETERMINING THE LONGITUDINAL POSITION OF THE CENTER OF GRAVITY OF AN AIRCRAFT PROVIDED WITH AN ADJUSTABLE HORIZONTAL STABILIZER

FIELD OF THE INVENTION

The present invention relates to a process and a system for determining the longitudinal position of the centre of gravity of an aircraft provided with an adjustable horizontal stabilizer.

BACKGROUND OF THE INVENTION

It is known that the method generally used for determining the longitudinal position of the centre of gravity of an aircraft consists in weighing the aircraft on the ground, in measuring the quantities of fuel in the various tanks, in measuring or estimating the passenger and freight loads and in adding these data on a weight and balance chart. Each of these data may be permanently plotted on said chart to follow the evolution of the position of the centre of gravity. These operations are effected either manually or with the aid of a computer which takes into account the starting data and permanently plots in the course of the flight the variations in mass due to the reduction and transfer of fuel.

This known method, which seems to be the only one used at the present time, gives good results insofar as all the data entered are correct, as the transfers have been correctly plotted and as there were no operational contingencies in the various transfer, measuring or calculation systems.

However, it does not make it possible to make a resetting to zero in flight in order to trigger off a fresh process of measuring, in the event of one of the elements having been used for obtaining the measurement being in doubt. This defect is inherent in any system referring to data integrated from the ground measurements.

This known method is therefore limited in reliability and especially in safety.

Up to the present time, for wide-body aircraft, this drawback was hardly inconvenient and only the ground measurement and calculations, before take-off, were important.

In fact, such aircraft could be found only in a stable configuration, i.e. in no case did the centre of gravity risk being located to the rear of the point of manoeuvring, at their departure; further, these aircraft could not dangerously fluctuate, in flight, from this configuration of stability, due to the situation of the different tanks and the sequences of filling and emptying studied so that the aircraft in flight remains within the certified centering limits.

However, on the supersonic aircraft CONCORDE, the problem has been raised and solved in a conventional manner thanks to redundant alarm systems and computers. In fact, to maintain the aircraft easily manoeuvrable in supersonic flight, and therefore to maintain a small distance between the centre of gravity and the point of manoeuvring (defined as the point where the elevator has an infinite efficiency on the load factor of the aircraft), transfers of fuel are effected towards the rear at the moment of passage into supersonic flight; and, inversely, upon return to subsonic flight, a reverse transfer is effected in order not to risk instability. However, in this particular case, being given the operation effected (transfer of fuel in one sole operation), the system is hardly complex.

Similarly, on the wide-body aircraft AIRBUS A 310-300, which presents an adjustable horizontal stabilizer, an additional fuel tank is installed in said adjustable horizontal stabilizer in order to increase the radius of action and to improve the performances by displacement of the centre of gravity towards the rear.

In that case, in order to effect calculation of the longitudinal position of the centre of gravity and to monitor the transfer of fuel so as to maintain minimum the distance between the centre of gravity and the point of manoeuvring, whilst maintaining the stability of the aircraft, a centering computer permanently manages the transfers of fuel. This computer uses the known method, recalled hereinabove, based on the sum of the data.

Furthermore, it is known that the modern technique of aircraft construction is developing towards the production of aircraft with artificial stability, i.e. in which the centre of gravity lies to the rear of the point with respect to which the moment of the aerodynamic forces is independent of the incidence, which necessitates permanently effecting corrections by acting on the elevator at a high frequency.

In such aircraft with artificial stability, the problem of determination of the position of the centre of gravity is therefore acute, as this position must be known in a reliable and precise manner in order to be able to be permanently monitored to ensure flight safety of these aircraft.

SUMMARY OF THE INVENTION

The present invention has for its object a process for reliably and precisely determining the longitudinal position of the centre of gravity of an aircraft, and overcoming the drawbacks of the known method recalled hereinabove.

To that end, according to the invention, the process for determining the longitudinal position of the centre of gravity of an aircraft provided with an adjustable horizontal stabilizer is noteworthy in that, at a point of flight for which said aircraft is in equilibrium with its elevator in aerodynamic extension of said adjustable horizontal stabilizer, said position of the centre of gravity is calculated from:

the position of the focus of said aircraft, the measurement of the deflection of said adjustable horizontal stabilizer;

a first function of the speed of the engines of the aircraft and the Mach number, this first function being representative of the value of the deflection of said adjustable horizontal stabilizer, in the case of said centre of gravity lying at the focus of said aircraft; and a second function of the coefficient of lift of said aircraft and said Mach number, this second function being representative of the deviation of deflection of said horizontal stabilizer for a deviation of 1% of the position of the centre of gravity.

As will be seen in greater detail hereinafter, the present invention takes advantage of the fact that the deflection of the adjustable horizontal stabilizer, when the aircraft is trimmed, i.e when the equilibrium in moment of pitch is effected and the elevator presents a zero deflection with respect to said stabilizer, is a function of the conditions of flight and of the position of the centre of gravity of the aircraft. The present invention exploits in particular manner the laws of mechanics of the flight, and in particular the equation of the moment of pitch of the aircraft about the centre of gravity thereof.

In this way, in the process according to the invention, the longitudinal position of the centre of gravity of the aircraft is determined solely from a structural datum of the aircraft (position of the focus), from data (Mach number, speed of the engines and coefficient of lift) measured in flight and moreover already processed or elaborated by the systems of the aircraft for other purposes and therefore already available, and from the measurement of the deflection of the adjustable horizontal stabilizer.

As will be demonstrated hereinafter, the process of the invention advantageously employs the following equation:

$$x_G = x_F + \frac{iH - K(M,N1)}{H(Cz,M)}$$

in which:

$x_G$ is the abscissa of the effective position of the centre of gravity G, measured along the longitudinal axis of the aircraft from a reference origin and referred to the mean aerodynamic chord (generally designated by MAC) of the principal wing unit of said aircraft;

$x_F$ is the abscissa of the position of the centre of gravity G for which the coefficient of lift of the aircraft has no influence on the deflection of equilibrium of the adjustable horizontal stabilizer, i.e. the position for which said centre of gravity lies at the focus of the complete aircraft, this abscissa being measured along the longitudinal axis of the aircraft from said reference origin and likewise being referred to said mean aerodynamic chord;

iH is the measurement, at the point of flight considered, of the real deflection of the adjustable horizontal stabilizer for the trimmed aircraft;

K(M,N1) is the first function of the speed N1 of the engines of the aircraft and the Mach number M at the point of flight considered; and H(Cz,M) is the second function of the coefficient of lift Cz of the aircraft and the Mach number M at said point of flight.

The functions K(M,N1) and H(Cz,M) are linked with the geometry of the aircraft and its engines. They may each be in the form of a table with two inputs - the input of parameter M and the input of parameter N1 for the function K(M,N1) and the input of parameter Cz and the input of parameter meter M for the function H(Cz,M)—and with an output giving the value of the corresponding function for pairs of particular values of said input parameters. Said functions may be determined either by calculation or from tests in flight and/or in wind tunnel.

The first function K(M,N1) which, as indicated hereinabove, is representative of the value of deflection of said adjustable horizontal stabilizer in the case of the centre of gravity lying at the focus, may advantageously be in the form of the combination of three functions, each of one sole variable, for example of the type:

$$K(M,N1) = F(M) + G1(N1).G2(M)$$

in which:

F(M) is a function of the Mach number M alone, representative of the aerodynamics of the aircraft;

G1(N1) is a function of the engine speed N1 alone, and

G2(M) is a function of the Mach number M alone, representative of the moment of pitch due to the thrust of the engines.

In this way, in the composition of the function K(M,N1), the influence of the geometry of the aircraft is dissociated from the overall influence of its engines.

Similarly, it may be advantageous if the second function H(Cz,M), representative of the deviation of deflection of the adjustable horizontal stabilizer for a deviation of 1% from the position of the centre of gravity is in the form of the combination of two functions H1(M) and H2(Cz), each of one sole variable.

Thus, in order to know the value of said first and second functions at the point of flight considered, it is necessary to know the corresponding value of each of the three parameters which are the Mach number M, the engine speed N1 and the coefficient of lift Cz.

The Mach number may for example be furnished by the onboard computer ADC (Air Data Computer), whilst the speed of the engines is directly delivered by the monitoring device associated with the latter.

In order to know the value of the coefficient of lift Cz, the law linking the latter with the Mach number and with the angle of incidence of the aircraft may be used. In that case, in addition to the measurement of M, it is therefore necessary to measure said angle of incidence. The parameters which are the mass m of the aircraft (given for example by the FMS system (Flight Management System) and the dynamic pressure Pd (given by the ACD computer) may also be used. In the latter case, the coefficient of lift Cz is calculated by the formula:

$$Cz = \frac{m \cdot g}{S \cdot Pd}$$

in which g is the acceleration of the gravity and S the reference surface of the aircraft.

The process according to the invention therefore makes it possible to calculate the position of the centre of gravity of the aircraft in flight independently of the measurements made on the ground and solely from parameters already elaborated, with the exception of the measurement of deflection of the adjustable horizontal stabilizer which necessitates a conventional angle measuring system.

A system for carrying out this process may thus furnish an indication of the position of the centre of gravity, which may be presented directly in visual form, for example on cathode ray tubes, or be used in computers, either for elaborating particular functions where it is necessary to take the centering into account or for checking functions elaborated by different ways.

Such a system may be used in particular for checking results obtained by another method or detecting an extreme limiting position, and triggering off an alarm system.

According to the present invention, a system for determining the longitudinal position of the centre of gravity of an aircraft provided with an adjustable horizontal stabilizer according to the process defined hereinabove, is thus noteworthy:

in that it comprises:
a computer,
an angular position sensor associated with said adjustable horizontal stabilizer;
a first device capable of delivering information representative of the speed of the engines of the aircraft;

a second device capable of delivering information representative of the Mach number;

a third device capable of delivering information representative of the coefficient of lift of the aircraft;

first memory means in which is stored said first function, said first memory means receiving the information delivered by said first and second devices and delivering at their output the corresponding values of said first function;

second memory means in which is stored said second function, said second memory means receiving the information delivered by said second and third devices and delivering at their output the corresponding values of said second function;

and in that said computer receives information on the position of the focus of the aircraft in addition to the information delivered by said first and second memory means as well as that delivered by said angular position sensor.

According to a first embodiment of this system, said third device comprises a probe for detecting the angle of incidence of the aircraft, as well as third memory means in which is stored a function linking said coefficient of lift of the aircraft with said angle of incidence and with the Mach number, said third memory means receiving the information delivered by said second device and by said probe and delivering at their output the corresponding values of said coefficient of lift.

In a variant embodiment, said third device comprises calculating means receiving information on the mass of the aircraft, the dynamic pressure, the value of acceleration of the gravity and on the value of the reference surface of the aircraft and calculating said coefficient of lift.

BRIEF DESCRIPTION OF THE DRAWING

The Figures of the accompanying drawing will clearly show how the invention may be carried out. In these Figures, identical references designate like elements.

DETAILED DESCRIPTION OF PREFERRED EMBODIMENTS

Figure 1:
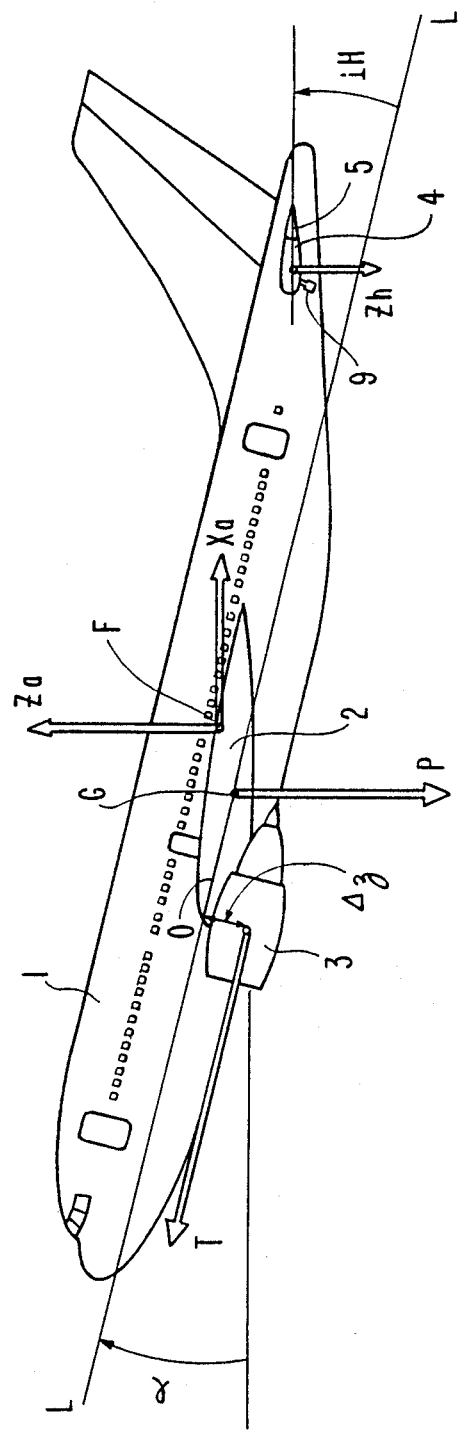
FIG. 1 schematically shows a wide-body aircraft and the system of the forces intervening in the equilibrium at the moment of pitch.

The wide body aircraft 1, shown in FIG. 1, presents a longitudinal axis L—L and comprises a principal wing unit 2 supporting engines 3 and an adjustable horizontal stabilizer 4, often called adjustable horizontal plane and designated by the abbreviation PHR. When this aircraft is not subjected to any movement of roll or of gyration, it essentially undergoes the action of the following forces:

its weight P, applied to the centre of gravity G and, of course, directed downwardly;

the aerodynamic lift Za of the complete aircraft, applied to the focus F and directed upwardly;

the aerodynamic drag Xa of the complete aircraft, applied to the focus F and directed rearwardly;

the thrust T of the engines 3 parallel to the axis L—L, directed forwardly and applied at a point of which the distance to said axis L—L is equal to $\Delta z$; and the aerodynamic negative lift Zh, directed downwardly, of the adjustable horizontal stabilizer 4, deflected by an angle iH with respect to axis L—L.

The weight P being applied to the centre of gravity G, its moment with respect to the latter is zero. Furthermore, the distance separating the focus F from axis L—L generally being very small (to the point of considering that said focus F lies on axis L—L), the centre of gravity arm of the aerodynamic drag Xa with respect to the centre of gravity G is zero, with the result that the moment of said aerodynamic drag Xa with respect to the centre of gravity G is also zero.

Consequently, it may be considered with a good approximation that the resultant moment of pitch about the centre of gravity G comprises the following components:

a moment M1, generated by the thrust T of the engines 3 and equal to the product T. $\Delta z$;

a moment M2, generated by the aerodynamic lift Za; and a moment M3, generated by the aerodynamic negative lift Zh.

To these three components must be added a fourth, M4, corresponding to the aerodynamic pitch for a zero lift and a likewise zero deflection iH of the stabilizer 4. To that end, a coefficient of aerodynamic pitch moment is defined for a zero lift and a zero deflection iH, this coefficient being designated by Cmo.

If S designates the reference surface of the wing unit 1, the reference chord (or mean aerodynamic chord) of the wing unit and Pd the dynamic pressure at the point of flight considered, moment M4 is equal to the product S.Pd.1.Cmo. It will be noted that if, as is usual, an origin O is chosen on axis L—L and if the abscissae $x_G$ and $x_F$ of points G and F (the latter being assumed to be on axis L—L) are expressed as % of said reference chord 1, moment M2 is equal to the product $Z_a.(x_G - x_F).1$.

Furthermore, if Z$\alpha$h designates the gradient of negative lift of the horizontal stabilizer 4 corresponding to the local angle of incidence of the stabilizer 4, moment M3 is equal to the product $Z\alpha h.iH.1$.

When the aircraft 1 is trimmed, i.e. when the equilibrium in pitch moment is effected and the elevator 5, borne by the trailing edge of the stabilizer 4, is in aerodynamic extension of said stabilizer (zero deflection), the equilibrium in pitch moment is written:

$$M1 + M2 + M3 + M4 = 0 \qquad (1)$$

By replacing in this equation (1) the different moments M1, M2, M3 and M4 by the values indicated hereinabove, the following is therefore obtained:

$$T.\Delta z + Z_a.(x_G - x_F).1 + Z\alpha h.iH.1 + S.Pd.1.Cmo = 0 \qquad (2)$$

It will be noted that, if Cz designates the coefficient of lift of the complete aircraft and Cz$\alpha$h the coefficient of the gradient of negative lift of the stabilizer 4, the following may be written:

$$Za = -S.Pd.Cz \text{ and} \qquad (3)$$

$$Z = \alpha h = S.Pd.Cz\alpha h \quad (4)$$

Consequently, equation (2) may be written:

$$T.\Delta z + S.Pd.1[-Cz(x_G - x_F) + Cz\alpha h.iH + CMo] = 0 \quad (5)$$

If iHRef designates the particular value of deflection iH corresponding to equilibrium when points G and F are merged, the following is obtained:

$$T.\Delta z + S.Pd.1[Cz\Delta h.iHRef + Cmo] = 0 \quad (6)$$

From equations (5) and (6) the following may be deduced:

$$x_G - x_F = \frac{iH - iHRef}{Cz\dfrac{Cz}{\alpha}h} \quad (7)$$

It will be noted that the ratio $$\frac{Cz}{Cz\alpha h}$$

corresponds to the value of the deviation of deflection iH−iHRef for which $x_G - x_F = 1\%$. Furthermore, since in known manner the efficacity of deflection of the stabilizer 4 depends on the flight conditions and, more particularly, on the Mach number M, this ratio may be considered as a function H depending on the two parameters Cz and M and designated hereinafter by H(Cz,M).

The following may thus be written:

$$x_G = x_F + \frac{iH - iHRef}{H(Cz,M)} \quad (8)$$

Moreover, from equation (6), it is seen that iHRef depends on T, i.e. on the speed N1 of the engines, and on Cz$\alpha$h and on Cmo, i.e. the Mach number M. The parameter iHRef may therefore be considered as a function dependent on parameters N1 and M. Such a function may for example be written in the following form:

$$iHRef = F(M) + G1(N1).G2(M) \quad (9)$$

in which F(M) represents $$\frac{Cmo}{Cz\alpha h}$$

and G1(N1).G2(M) represents $$\frac{T\Delta z}{S \cdot Pd \cdot 1 \cdot Cz\alpha h}$$

Figure 2:
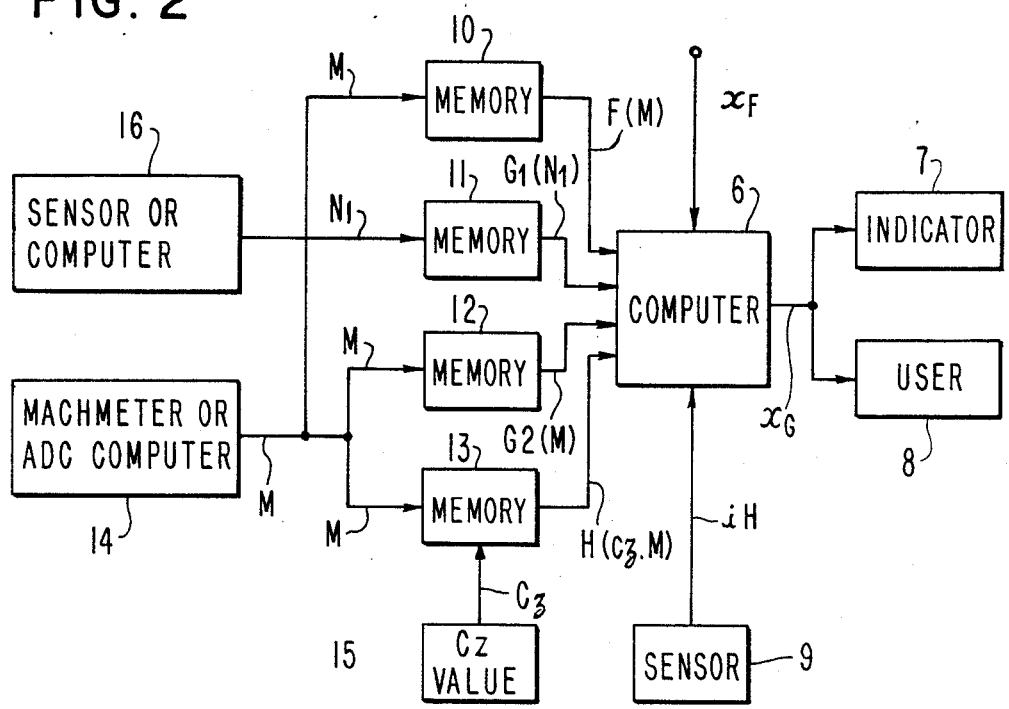
FIG. 2 gives the block diagram of an embodiment of the device according to the invention.

For carrying out the present invention, a system is provided which is taken on board the aircraft 1 and of which the block diagram is given in FIG. 2. This system comprises a computer 6 capable of addressing the instantaneous position of the centre of gravity G, i.e. the calculated magnitude $x_G$ defined hereinabove, to one or more indicators 7 and/or to one or more users 8, such as for example flight control computers.

The computer 6 receives, or has in memory, the magnitude $x_F$ which is a constructional characteristic of the aircraft 1 and which, as mentioned hereinabove, defines the position of the focus F. Moreover, a sensor 9 (cf. likewise FIG. 1), for example of the synchrotransmitter type, detects the angular position of the adjustable stabilizer 4 and addresses the value iH to said computer 6.

With said computer 6 are associated memories 10, 11, 12 and 13 containing the different functions useful for calculating the magnitude $x_G$. Memories 10, 12 and 13 receive from a Machmeter or an ADC computer 14 the value M of the Mach number. Moreover, memory 13 receives from a device 15 the value of Cz. Finally, memory 11 receives from a sensor or a computer 16 associated with the engines 3, the value of speed N1.

In memories 10, 11, 12 and 13 are respectively contained the functions F(M), G1(N1), G2(M) and H(Cz,M), which are transmitted to computer 6. In this way, the latter may calculate iHRef by equation (9) and x by equation (8).

Figure 3:
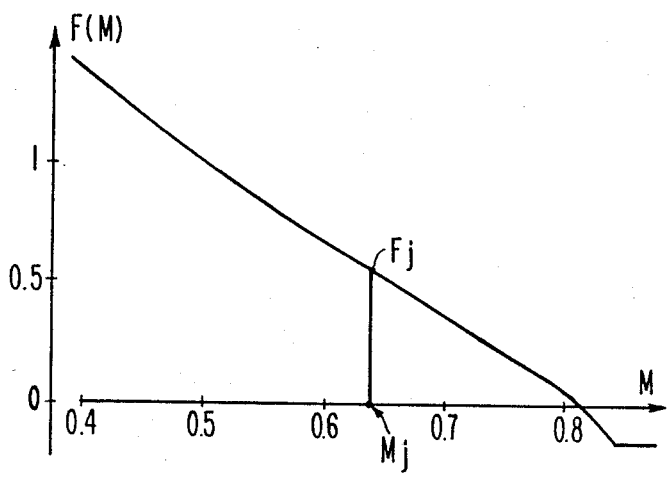
FIGS. 3, 4 and 5 indicate the components of said first function.
Figure 4:
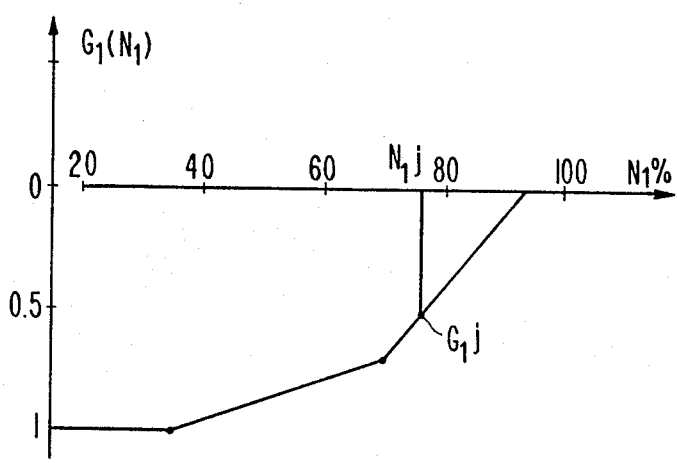
Figure 5:
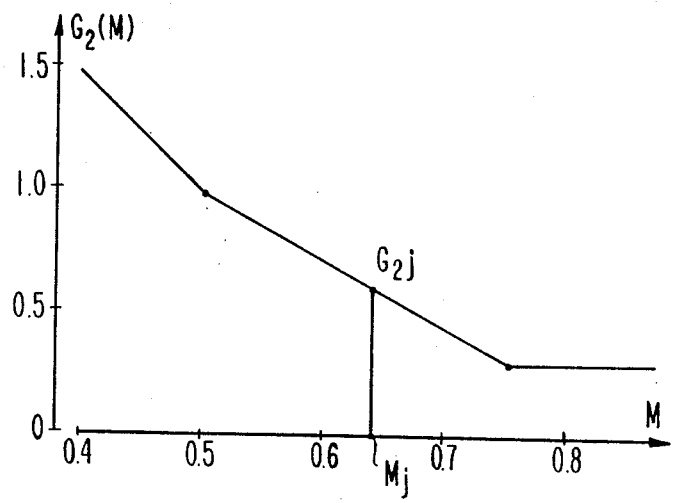

FIGS. 3, 4 and 5 respectively show examples of functions F(M), G1(N1) and G2(M) relative to an AIRBUS aircraft, type A310. The functions F(M) and G2(M) are expressed in degrees of angle, whilst the function G1(N1) is a number without dimension. It may be seen that to any current value Mj (or at least to a plurality of such current values) of the Mach number M there corresponds a particular value Fj and a particular value G2j of functions F(M) and G2(M) and that to any current value N1j (or at least to a plurality of such current values) of the engine speed N1 there corresponds a particular value G1j of the function G1(N1). In this way, for a plurality of pairs of values Mj,N1j, the corresponding values of the function iHRef are obtained, which are transmitted to computer 6.

The functions F(M), G1(N1) and G2(M) are characteristic of the geometry of the aircraft 1 and of its engines 3. They may be established by theoretical calculation or by measurements.

Figure 6:
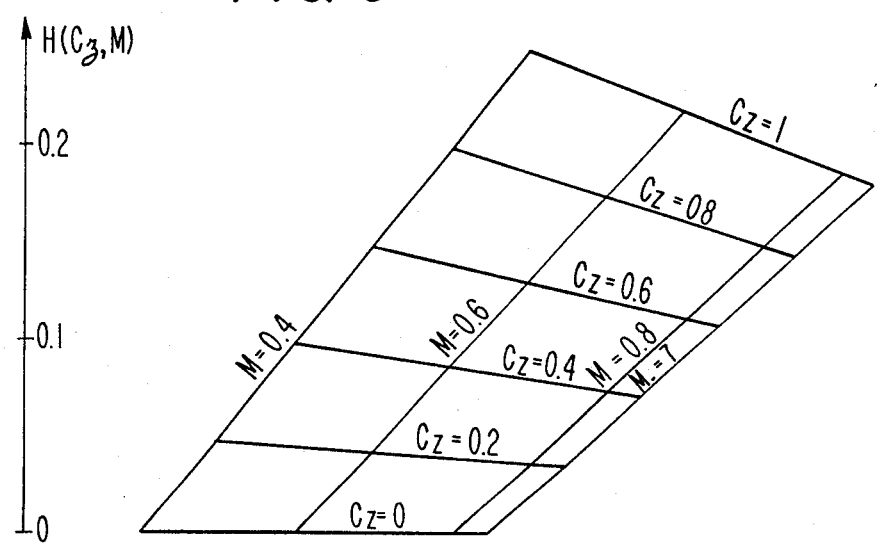
FIG. 6 illustrates a chart representative of said second function.

The same applies to function H(Cz,M), of which an example is given in FIG. 6), contained in the memory 13. It may be seen in this Figure that, to a plurality of pairs of values of M and of Cz, there correspond values of the function H (expressed in degrees per percents), addressed to the computer 6.

This computer 6, from $x_F$, iH,H(Cz,M) and K(M,N1)=iHRef, calculates $x_G$ which it addresses to devices 7 and 8.

Figure 7:
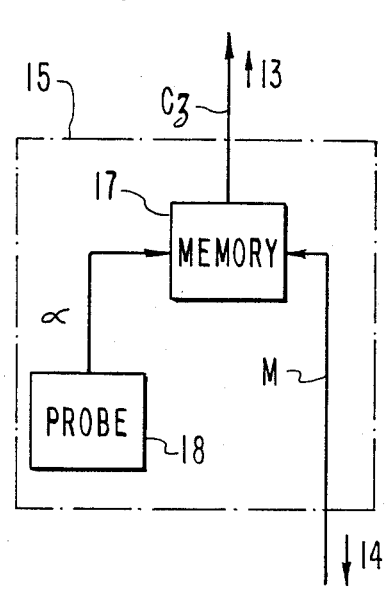
FIG. 7 illustrates a first embodiment of the device generating the coefficient of lift.
Figure 8:
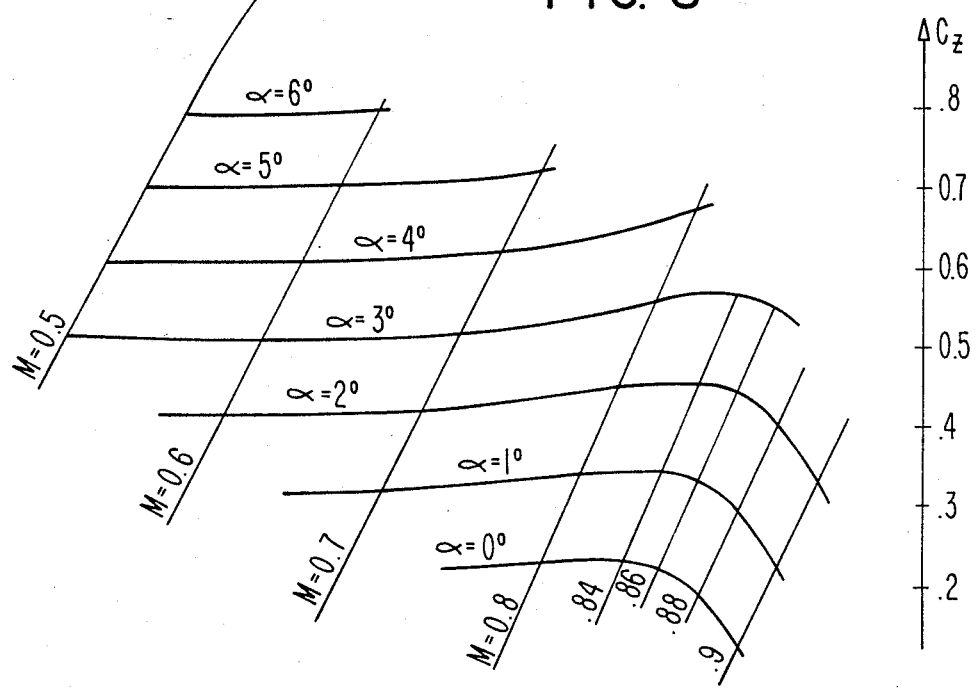
FIG. 8 is a chart illustrating the functioning of the device of FIG. 7.

FIG. 7 shows a first embodiment of the device 15 intended to deliver the magnitude Cz. In this embodiment, the chart of FIG. 8 is used, characteristic of the aircraft in question and linking the coefficient of lift Cz with the Mach number M and the angle of incidence $\alpha$ of the aircraft. In FIG. 8, it may be seen that, for a plurality of pairs of values of parameters $\alpha$ and M, the corresponding value Cz is obtained. In this way, the device 15 then comprises a memory 17, in which is stored the function shown in FIG. 8. This memory 17 receives the Mach number M of the device 14 (Machmeter or ADC computer) and the angle of incidence $\alpha$ of an incidence probe 18 (not shown in FIG. 1). Consequently, memory 17 may address the corresponding value Cz to memory 13.

Figure 9:
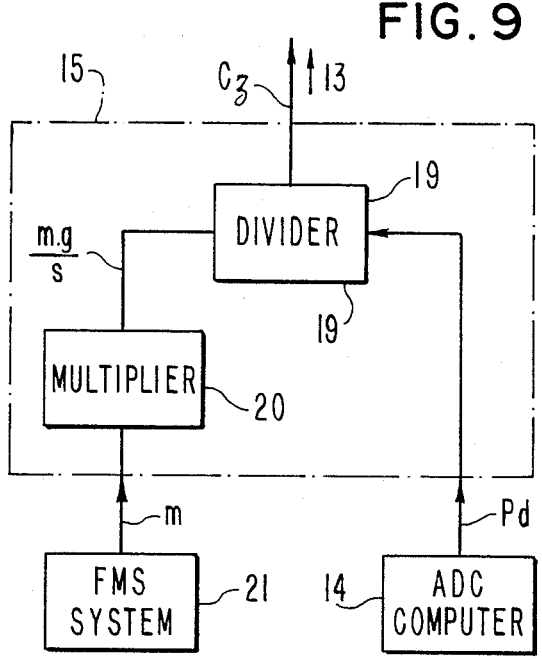
FIG. 9 illustrates a second embodiment of the device generating the coefficient of lift.

In the variant embodiment of FIG. 9, the device 15 comprises a divider 19 and a multiplier 20. This multiplier 19 receives from the FMS system 21 the mass m of the aircraft 1, which it multiplies by the constant ratio g/S of the acceleration of the gravity g by the reference surface S of the aircraft 1. At the output of the multiplier 20 therefore appears the magnitude $$\frac{mg}{S} = \frac{P}{S}.$$

This latter magnitude is applied to the divider 19, which furthermore receives from the ADC computer 14 the dynamic pressure Pd. Consequently, the divider 19 may deliver at its output, at the address of memory 13, the ratio $$\frac{mg}{Pd \cdot S},$$

which is equal to Cz.

We claim:

1. A system for determining the longitudinal position $X_G$ of the center of gravity G of an aircraft in flight, said aircraft being provided with an adjustable horizontal stabilizer which is deflectable and to which is articulated an elevator, said aircraft having a determined focus F with a longitudinal position $X_F$, speed of engine, Mach number and coefficient of lift, said system comprising:

means for transferring fuel from one tank of the aircraft to another;

angular position sensing means associated with said adjustable horizontal stabilizer for measuring the deflection thereof and delivering said deflection information;

first means for delivering information representative of the speed of the engine of the aircraft;

second means for delivering information representative of the Mach number;

third means for delivering information representative of the coefficient of lift of the aircraft;

first memory means in which is stored a first function of the speed of the engine of the aircraft and the Mach number, said first function being representative of the value of the deflection of said adjustable horizontal stabilizer, in the case where the center of gravity G lies at the focus F of said aircraft, said first memory means receiving the information delivered by said first and second information delivering means and delivering at the output of the first memory means the corresponding values of said first function;

second memory means in which is stored a second function of the coefficient of lift of said aircraft and said Mach number, said second function being representative of the deviation of deflection of said horizontal stabilizer for a deviation of 1 percent from the position of the center of gravity, that is the deviation of deflection for which $X_G X_F = 1$ percent, said second memory means receiving the information delivered by said second and third information delivering means and delivering at the output of the second memory means the corresponding values of said second function; and computing means based on the position $X_F$ of the focus F of the aircraft in addition to the information delivered by said first and second memory means as well as that delivered by said angular position sensing means and, at a point of flight for which the aircraft is in equilibrium with its elevator in aerodynamic extension of said adjustable horizontal stabilizer, said computing means generating a center of gravity signal representing the longitudinal position $X_G$ of the aircraft center of gravity G, said signal being delivered to said transfer means in order to control the longitudinal position of the center of gravity of the aircraft, acting on the distribution of fuel among said fuel tanks.

2. A system according to claim 1, wherein said computing means calculate the following equation:

$$X_G = X_F + \frac{iH - K(M,N1)}{H(M)}$$

in which:

$X_G$ is the abscissa of the longitudinal position of the center of gravity G, measured along the longitudinal axis of the aircraft from a reference origin and referred to the means aerodynamic chord of the principal wing unit of said aircraft;

$X_F$ is the abscissa of the position of the center of gravity G for which the coefficient of lift of the aircraft has no influence on the deflection of equilibrium of the adjustable horizontal stabilizer, that is the position for which said center of gravity lies at the focus F of the complete aircraft, said abscissa being measured along the longitudinal axis of the aircraft from said reference origin and being referred to said mean aerodynamic chord;

iH is the measurement, at said point of flight, of the real deflection of the adjustable horizontal stabilizer for the aircraft when in a trimmed condition;

K(M,N1) is the first function of the speed of the engine of the aircraft and the Mach number at said point of flight; and H(Cz,M) is the second function of the coefficient of lift of the aircraft and the Mach number at said point of flight.

3. A system according to claim 2, wherein said first function is a combination of the three following functions each having one variable:

a function of the Mach number alone, representative of the aerodynamics of the aircraft;

a function of the engine speed alone; and a function of the Mach number alone, representative of the moment of pitch due to the thrust of the engine.

4. A system according to claim 2, wherein said second function is a combination of the two following functions each having one variable:

a function of the Mach number alone, and a function of the coefficient of lift alone.

5. A system according to claim 1, wherein said third information delivering means comprise a probe for detecting an angle of incidence of the aircraft, as well as third memory means in which is stored a function linking said coefficient of lift of the aircraft with said angle of incidence and with the Mach number, said third memory means receiving the information delivered by said second information delivering means and by said probe and delivering at the output of the third memory means the corresponding values of said coefficient of lift.

6. A system according to claim 1, wherein said third information delivering means comprise calculating means based on the mass of the aircraft, the dynamic pressure at the point of flight being considered, a value of acceleration of the gravity and a value of the reference surface of the aircraft for calculating said coefficient of lift.

7. A system for controlling the longitudinal position $X_G$ of the center of gravity G of an aircraft in flight, said aircraft being provided with an adjustable horizontal stabilizer which is deflectable and to which is articulated an elevator, and being provided with fuel tanks, said aircraft having a determined focus F with a longitudinal position $X_F$, speed of engine, and Mach number, said system comprising:

means for transferring fuel from one tank of the aircraft to another; and a device for determining the longitudinal position of the center of gravity of the aircraft, said device including:

angular position sensing means associated with said adjustable horizontal stabilizer for measuring the deflection thereof and delivering said deflection information;

first means for delivering information representative of the speed of the engine of the aircraft;

second means for delivering information representative of the Mach number;

third means for delivering information representative of the coefficient of lift of the aircraft;

first memory means in which is stored a first function of the speed of the engine of the aircraft and the Mach number, said first function being representative of the value of the deflection of said adjustable horizontal stabilizer, in the case where the center of gravity G lies at the focus F of said aircraft, said first memory means receiving the information delivered by said first and second information deliverying means and delivering at the output of the first memory means the corresponding values of said first function;

second memory means in which is stored a second function of the coefficient of lift of said aircraft and said Mach number, said second function being representative of a deviation of deflection of said horizontal stabilizer for a deviation of 1 percent from the position of the center of gravity, that is the deviation of deflection for which $X_g X_F = 1$ percent, said second memory means receiving the information delivered by said second and third information delivering means and delivering at the output of the memory means the corresponding values of said second function; and computing means based on the position $X_F$ of the focus F of the aircraft in addition to the information delivered by the first and second memory means as well as that delivered by said angular position sensing means, and, at a point of flight for which the aircraft is in equilibrium with its elevator in aerodynamic extension of said adjustable horizontal stabilizer, said computing means generating a center of gravity signal representing the longitudinal position $X_G$ of the aircraft center of gravity, said signal being delivered to said transfer means in order to control the longitudinal position of the center of gravity of the aircraft, acting on the distribution of fuel among said fuel tanks.

8. A system according to claim 7, wherein said transfer means are automatic transfer means.

9. A system according to claim 7, wherein said computing means calculates the following equation:

$$X_G = X_F + \frac{iH - K(M,N1)}{H(M)}$$

in which:

$X_G$ is the abscissa of the longitudinal position of the center of gravity G, measured along the longitudinal axis of the aircraft from a reference origin and referred to the mean aerodynamic chord of the principal wing unit of said aircraft;

$X_F$ is the abscissa of the position of the center of gravity G for which the coefficient of lift of the aircraft has no influence on the deflection of equilibrium of the adjustable horizontal stabilizer, that is the position for which said center of gravity lies at the focus F of the complete aircraft, said abscissa being measured along the longitudinal axis of the aircraft from said reference origin and being referred to said mean aerodynamic chord;

iH is the measurement, at said point of flight, of the real deflection of the adjustable horizontal stabilizer for the trimmed aircraft;

K(M,N1) is the first function of the speed of the engine of the aircraft and the Mach number at said point of flight; and H(Cz,M) is the second function of the coefficient of lift of the aircraft and the Mach number at said point of flight.

10. A system according to claim 9, wherein said first function is a combination of the three following functions each having one variable:

a function of the Mach number alone, representative of the aerodynamics of the aircraft;

a function of the engine speed alone, and a function of the Mach number alone, representative of the moment of pitch due to the thrust of the engine.

11. A system according to claim 9, wherein said second function is a combination of the two following functions each having one variable:

a function of the Mach number alone, and a function of the coefficient of lift alone.

12. A system according to claim 7, wherein said third information delivering means comprise a probe for detecting an angle of incidence of the aircraft, as well as third memory means in which is stored a function linking said coefficient of lift of the aircraft with said angle of incidence and with the Mach number, said third memory means receiving the information delivered by said second information delivering means and by said probe and delivering at the output of the third memory means the corresponding values of said coefficient of lift.

13. A system according to claim 7, wherein said third information delivering means comprise calculating means based on the mass of the aircraft, the dynamic pressure at the point of flight being considered, a value of acceleration of the gravity and a value of the reference surface of the aircraft for calculating said coefficient of lift.

* * * * *